Figure 1:
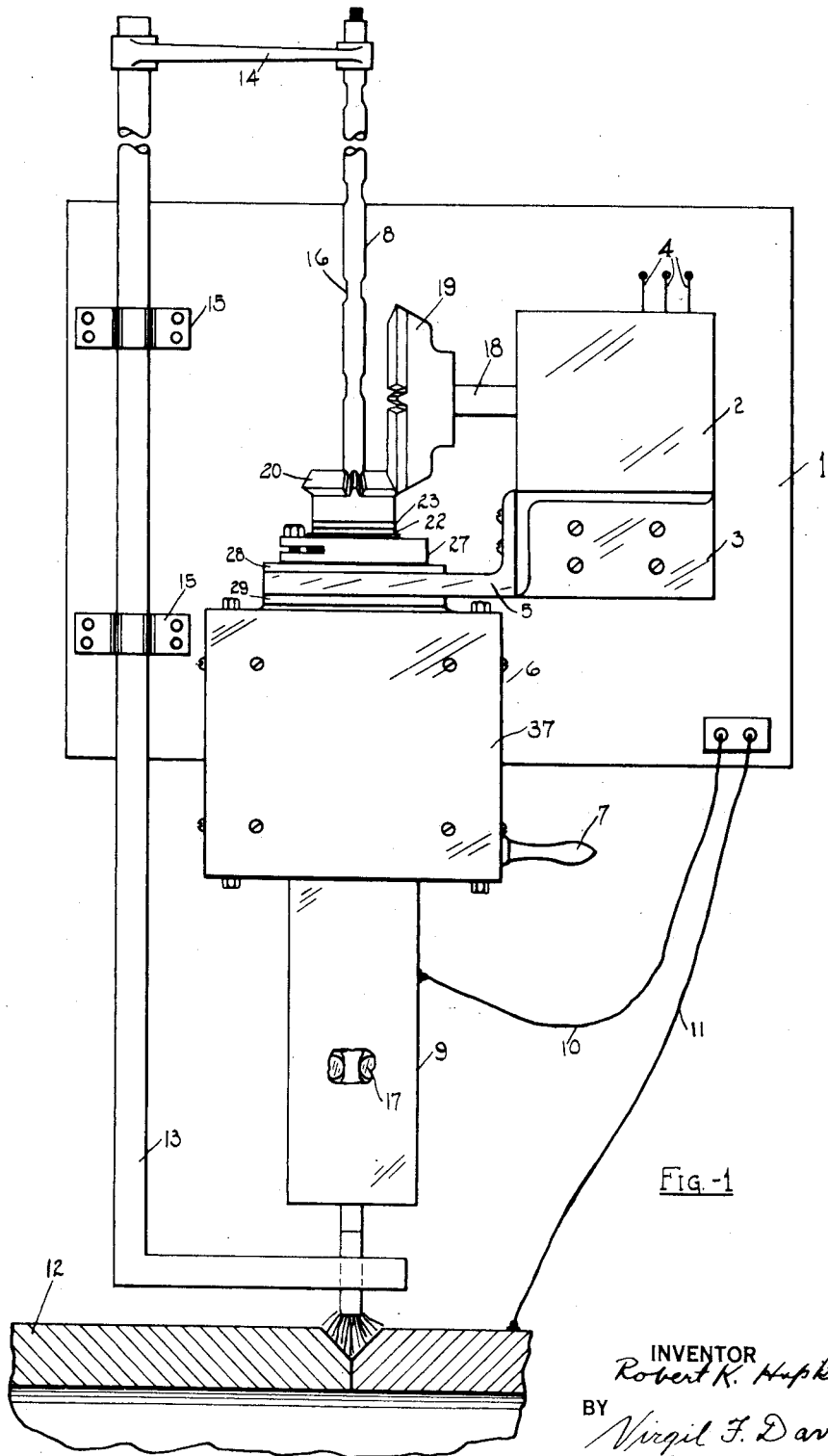

April 17, 1934.    R. K. HOPKINS    1,955,001
WELDING ELECTRODE FEEDING DEVICE
Filed May 25, 1933    3 Sheets-Sheet 1

INVENTOR
Robert K. Hopkins
BY
Virgil F. Davies
ATTORNEY

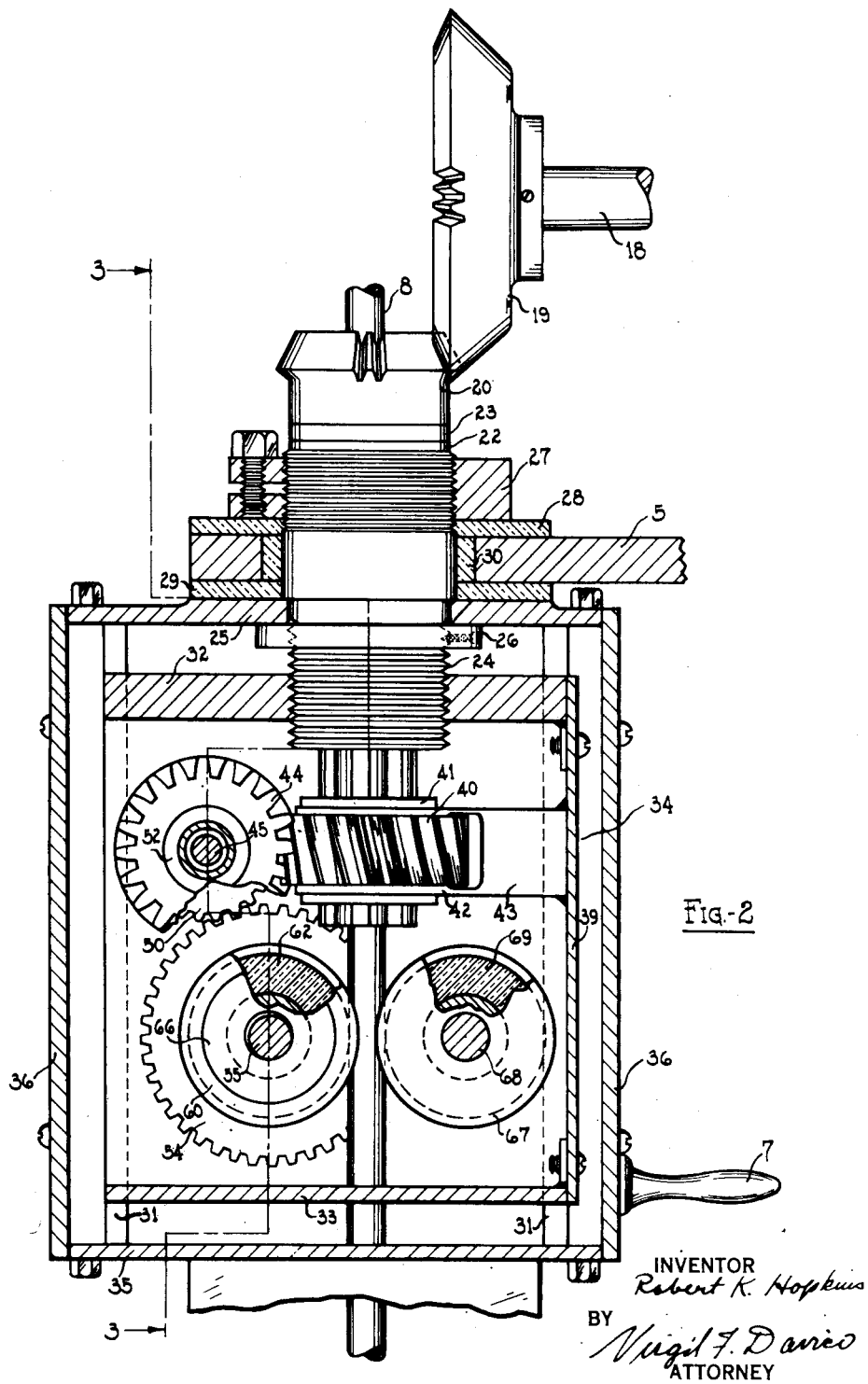

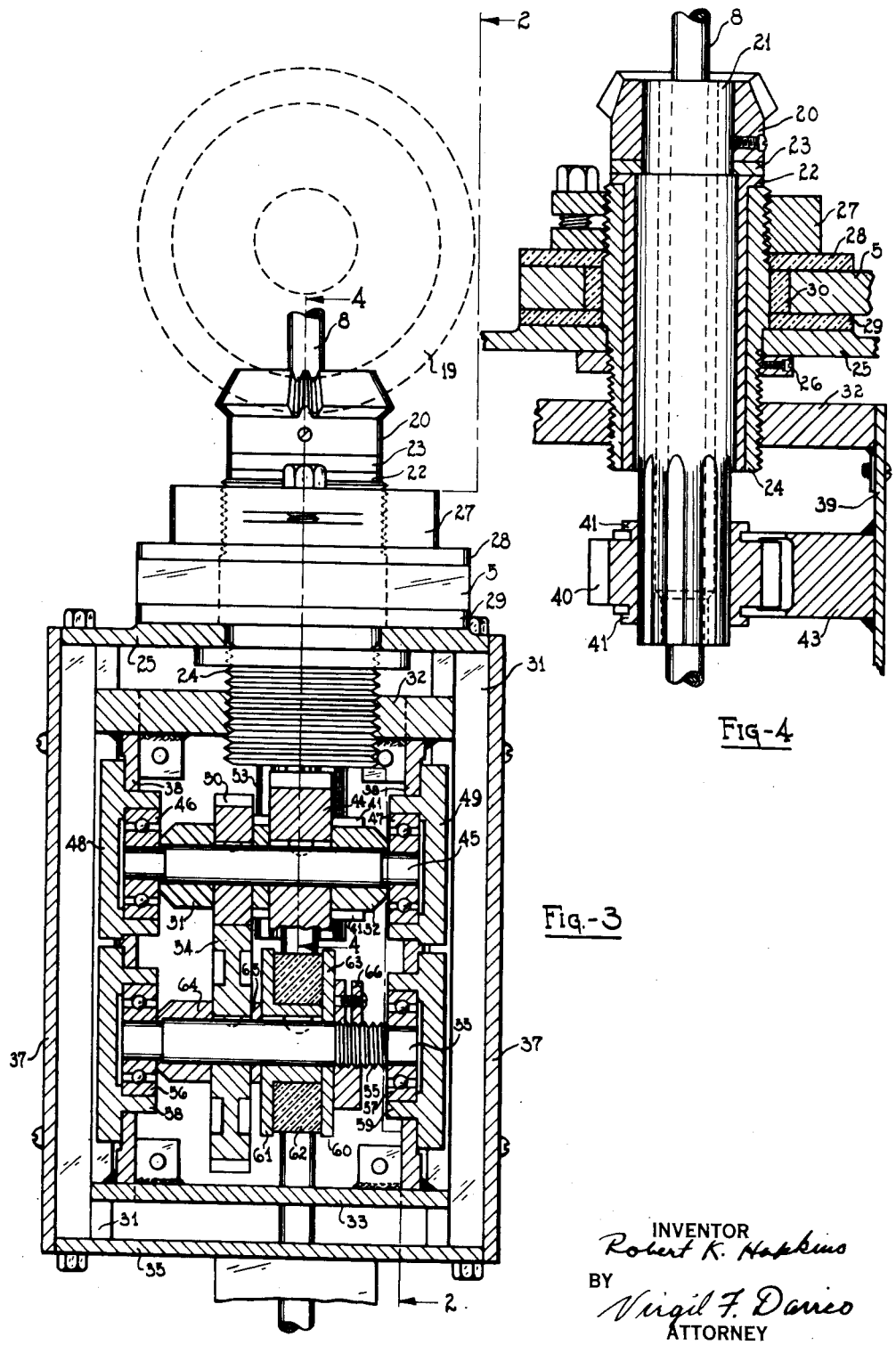

Patented Apr. 17, 1934

1,955,001

UNITED STATES PATENT OFFICE 1,955,001

WELDING ELECTRODE FEEDING DEVICE

Robert K. Hopkins, New York, N. Y., assignor to M. W. Kellogg Co., New York, N. Y., a corporation of Delaware Application May 25, 1933, Serial No. 672,754

16 Claims. (Cl. 219—8)

This invention relates to electric arc welding, and in particular to apparatus for feeding the welding electrode to the arc.

In uniting the parts of articles by electric arc welding, as for instance in uniting the thick plates in making pressure vessels, it oftentimes happens, through causes not always controllable, that the arc does not pass from the end of the welding electrode to the floor of the welding groove immediately below it but blows to the side and passes from the welding electrode to the side of the welding groove or it blows along the welding groove and passes from the side of the welding electrode to the pool of molten metal in back of the electrode. In the case of hand welding neither type of blow is serious as the welder can quickly manipulate the welding electrode as required to righten the arc.

In the case of machine welding both types of blow are serious. Side blow invariably washes out considerable metal from the side of the welding groove before the arc rights itself or is broken to prevent further damage. The cavities thus produced render the completion of the weld difficult as it is almost impossible to properly fill them and obtain the required molecular bond between their walls and the weld metal. Magnetic blow, i. e., the blow along the welding groove, by reason of the fact that the arc passes from the side of the welding electrode, causes a depending tail of unconsumed welding electrode to form on the side opposite the arc. This tail, which aside from the non-conducting covering may also include part of the metallic core of the welding electrode, breaks off and falls into the groove to be covered by weld metal. A weld having one or more of such tails included therein is very imperfect and is a source of danger if it forms part of a pressure vessel.

The arc welding machines at present available are not arranged to allow righting of the arc during operation so that when a blow occurs it is either allowed to run its course, with the results above pointed out, or the machine is stopped, the arc broken, and the welding electrode rotated or replaced by a new welding electrode, after which a new arc is struck. This latter expedient if quickly carried out eliminates the ill effects of the blow, but it has the disadvantages that since it consumes time it increases the welding cost, and since the arc is broken and the weld metal cooled, a perfect continuous deposit of weld metal is not possible.

This invention contemplates a simple way of preventing the ill effects of the blow of the arc without increasing the welding time or affecting the character of the weld.

In accordance with my invention I provide a welding electrode feeding means, in combination with the usual elements of the electric arc welding machine, and arrange the drive and mounting thereof so that it may be rotated relative to the work as a unit with the welding electrode passing to the arc about the longitudinal axis of the welding electrode without interference with the feed of the welding electrode to the arc. By reason of this arrangement, when the arc blows the operator of the machine is enabled to rotate the welding electrode and the welding electrode feeding means as required to prevent the usual effects of the blow without skidding the welding electrode between the feeding wheels or prolonging or otherwise affecting the welding operation or interfering with the feed of the welding electrode to the arc. When the welding current is passed to the welding electrode through metallic contact means which contact with one or more portions of the welding electrode surface, I mount the contact means with the welding electrode feeding means to be rotatable therewith in order to eliminate the possibility of sparking due to rotation of the welding electrode relative to the contact means.

This invention has for an object an electric arc welding machine which permits rotation of the welding electrode during the welding operation without interference with normal operation of the machine.

This invention has for a further object an electric arc welding machine the welding electrode feeding means and the means for passing welding current to the welding electrode of which are rotatable with the welding electrode about the axis of the welding electrode.

This invention has for a still further object an electric arc welding machine which includes means that allow the welding electrode to be rotated during the operation of the machine, the means being such that they automatically compensate for the effect of rotation of the welding electrode so that the feed of the welding electrode to the arc is in no way affected by its rotation.

The further advantages and objects of this invention will be apparent from a consideration of the appended description of a preferred embodiment thereof taken with the accompanying drawings, in which, Fig. 1 is a front elevation of an electric arc welding machine which includes the features of my invention, Fig. 2 is a part sectional elevation of the novel welding electrode feeding means taken on line 2—2 of Fig. 3, Fig. 3 is a part sectional view taken on line 3—3 of Fig. 2, and Fig. 4 is a sectional view taken on line 4—4 of Fig. 3 with certain parts of the welding electrode feeding means omitted.

This invention is not limited to any particular type of electric arc welding machine, but is applicable to all types whether they are intended to use covered or bare welding electrodes and feed the electrode to the arc as a continuous length or as separate short sections. However, for the purposes of this application I choose to describe my invention in connection with an electric arc welding machine which is intended to feed a continuous welding electrode to the arc, the welding electrode being preferably covered and being made up of an indefinite number of easily joined sections.

Referring to the drawings:—

The welding current generator, the control means therefor, the electrical control for the welding electrode feeding motor, as well as the welding electrode oscillating motor etc., which per se form no part of this invention, will for the purpose of this description be considered as located in the rear of panel 1 with the welding electrode oscillating motor mounted to oscillate panel 1. A welding electrode feeding motor 2 is mounted on a support bracket 3 fastened to panel 1. Motor 2 is connected to its automatic speed control means, which has been stated as located in back of panel 1, and to the energy source through conductors 4. To bracket 3 is fastened bracket 5 upon which is supported for rotation the welding electrode feeding device 6. A handle 7 is provided for rotating welding electrode feeding device 6 about the axis of welding electrode 8. A contact device 9 connected through cable 10 to one side of the welding current source, previously stated as located in back of panel 1, is supported from the bottom of electrode feeding device 6 to be electrically insulated therefrom and rotates with electrode feeding device 6 as it is rotated by means of handle 7. Cable 11 connects the other side of the welding current source to the work 12. A welding electrode guide 13 which includes guide bracket 14 is fastened to panel 1 by means of supports 15.

Welding electrode 8 is made up of a plurality of connected sections each of which is easily connectable to the preceding section by a screw or similar joint so that in effect welding electrode 8 is of indefinite length. Each section of electrode 8 comprises a metallic core covered by a ceramic or similar coating scored at spaced intervals to expose areas 16 of the core through which the welding current may be passed from the welding current source. Although I prefer this type of electrode a bare electrode may be used if desired.

Contact device 9 may be of any construction suited to the type of welding electrode used. With the welding electrode 8 shown I may use a contact device 9 which includes spaced contact members such as rollers 17 arranged to contact with exposed areas 16 as they pass through contact device 9 to the arc. Rollers 17 should be so spaced that there is at least one pair of them at all times in contact with exposed areas 16. A contact device which includes spaced rollers is completely described in my co-pending application Serial Number 660,220 filed March 10, 1933.

Shaft 18 of motor 2 drives a bevel gear 19 which meshes with a bevel gear 20 mounted on a hollow shaft 21 through which passes welding electrode 8 on its way to the arc. Shaft 21 passes through a shouldered bushing 22, a washer 23 being interposed between shaft 21 and bushing 22. The bottom face of the shoulder of bushing 22 rests on the top of a sleeve 24 which encircles bushing 22 and passes through bracket 5. Sleeve 24 is threaded at both ends and passes through the top 25 of the casing of the welding electrode feeding device 6. A threaded collar 26 screws onto the lower end of sleeve 24 and limits the upward movement thereof. The upper threaded end of sleeve 24 engages nut 27 which is provided with a locking means. Between nut 27 and bracket 5 is an insulating washer 28, a similar insulating washer 29 being positioned between bracket 5 and top 25. An insulating bushing 30 is located between sleeve 24 and the edge of the hole in bracket 5. The arrangement just described is such that welding electrode feeding device 6 is supported on bracket 5 and rotatable relative thereto, also the arrangement is such that by adjusting nut 27 the resistance to rotation of feeding device 6 may always be made sufficient to prevent rotation of feeding device 6 under the influence of the drive of motor 2.

To each corner of top 25 is fastened, as for instance by bolts, a guide post 31. Guide posts 31 have metal removed from their inner corners to provide guide ways in which are adapted to move the corners of top plate 32 and bottom plate 33 of gear box 34. The bottom 35 as well as sides 36 and 37 of feeding device 6 are also fastened, as for instance by screws or bolts, to guide posts 31. Gear box 34 includes sides 38 which are connected, as for instance by welds, to top plate 32 and bottom plate 33 and side 39 which is screwed to pieces connected to top plate 32 and bottom plate 33. Top plate 32 is threaded to screw onto the lower threaded end of sleeve 24. Bottom plate 33 of gear box 34 and bottom 35 of feeding device 6 are perforated to allow welding electrode 8 to pass therethrough. To bottom 35 of feeding device 6 is fastened, by means not shown, contact device 9, insulation being interposed between the top of contact device 9 and bottom 35 to electrically separate contact device 9 from feeding device 6.

A spiral gear 40 is splined on the bottom end of hollow shaft 21 so as to be axially movable relative thereto. Spiral gear 40 includes grooved collars 41 in the grooves of which are adapted to fit the tines 42 of member 43. Member 43 is fastened to side 39, as for instance by welds, so that when feeding device 6 is rotated and top plate 32 moves up or down on the thread end of sleeve 24 member 43 will move spiral gear 40 up or down, as the case may be, to maintain the position of spiral gear 40 in gear box 34 fixed. Spiral gear 40 drives a spiral gear 44 mounted on shaft 45. Shaft 45 is supported in ball bearings 46 and 47 respectively in the housings 48 and 49 which are fastened to sides 38 of gear box 34. On shaft 45 is also mounted spur gear 50. Spiral gear 44 and spur gear 50 are maintained in their predetermined positions on shaft 45 by means of spacing sleeves 51 and 52 and washer 53.

Spur gear 50 drives spur gear 54 which is mounted on a shaft 55. Shaft 55 is supported in ball bearings 56 and 57 mounted respectively in the housings 58 and 59 which are fastened to sides 38 of gear box 34. On shaft 55 is also mounted welding electrode feeding wheel 60. Wheel 60 includes a flanged hub 61 on which is supported an annulus 62 of rubber or similar compressible material. Disc 63 completes wheel 60. Spur gear 54 and wheel 60 are maintained in their predetermined positions on shaft 55 by means of sleeve 64, washer 65 and nut 66, which screws on the threaded portion of shaft 55. Nut 66 is provided with a locking means for holding it from movement. Sleeve 64, washer 65 and nut 66 also serve to maintain the assembly of wheel 60.

A wheel 67, similar to wheel 60, is supported on a shaft 68 to rotate freely therewith and is adapted to contact with portions of welding electrode 8 diametrically opposite the portions contacted by wheel 60. Shaft 68 is also supported in ball bearings, not shown, supported in housings, also not shown, fastened to walls 38. Wheel 67 also includes a rubber annulus 69 similar to annulus 62. Wheels 60 and 67 are so spaced and annulae 62 and 69 are of such diameter that the normal distance between the faces of annulae 62 and 69, on a line which passes through the centers of wheels 60 and 67, is less than the diameter of welding electrode 8. Because of this arrangement when welding electrode 8 passes between wheels 60 and 67 annulae 62 and 69 are compressed and firmly grip the sides of electrode 8, thus preventing slippage between wheel 60 and electrode 8.

In operating the welding machine, above described, work 12 is prepared for welding and then positioned relative to the welding machine as required. Cables 10 and 11 are then connected and the welding current supply means, above stated as positioned in back of panel 1 set in operation. The circuit of motor 2 is then closed and the first section of welding electrode passed through bracket 14 and hollow shaft 21 to wheels 60 and 67. As shaft 18 of motor 2 rotates bevel gear 19 will rotate bevel gear 20 and hollow shaft 21. Hollow shaft 21 will in turn rotate spiral gear 40 which through spiral gear 44 will rotate shaft 45 and spur gear 50. The rotation of spur gear 50 will be transmitted to wheel 60 through spur gear 54 and shaft 55. Wheels 60 and 67 will pass welding electrode 8 between them and feed it through feeding device 6 and contact device 9 to work 12. In passing through contact device 9 the exposed areas will contact with rollers 17, or other contact means, to pass the welding current to metallic core of welding electrode 8.

When the end of welding electrode 8 touches work 12 the speed of motor 2 will change as required to establish the arc of desired length. After the arc is established the welding is commenced. When the end of the first section of welding electrode 8 approaches bevel gear 20 a second section is passed through guide bracket 14 and joined to the first section. This is repeated from time to time as the sections of welding electrode 8 are consumed.

During the welding when a magnetic or side blow of the arc occurs the operator of the machine will move handle 7 to rotate welding electrode 8, as well as feeding device 6 and contact device 9, to place the depending tail of the electrode, in the case of magnetic blow, in a position that it may be consumed, or in the case of side blow to direct the arc along the welding groove. It is noted that when welding electrode 8 is rotated, since contact device 9 rotates with it, there is no rotation of welding electrode 8 relative to contact device 9 so that there can be no sparking or interruption of the feed of the welding current to welding electrode 8. It is also noted that there is no skidding of welding electrode 8 relative to wheels 60 and 67.

When handle 7 is manipulated for the purpose just stated, spiral gear 44 will walk around spiral gear 40 to increase or decrease the rotation of feeding wheel 60. If this movement of spiral gear 44 is not compensated for, the feeding of welding electrode 8 will be changed momentarily as the arc control arrangements ordinarily do not act quickly enough to maintain the predetermined arc. With the electrode feeding device 6 above described movement of gear 44 is compensated for as it takes place and there is no change whatsoever in the feed of welding electrode 8. This results from the fact that as electrode feeding device 6 is rotated top 32 of gear box 34 rotates relative to sleeve 24 and moves gear box 34 up or down it in the guide ways of guide posts 31 through a distance exactly equal to the increase or decrease in rotation of feeding wheel 60. The disengagement of spiral gears 40 and 44 due to the movement mentioned is prevented by member 43 which serves to move spiral gear 40 with gear box 34. The results just mentioned are attained by properly choosing the pitch of the threads on the lower end of sleeve 24.

If desired the movement of gear box 34 upon rotation of electrode feeding device 6 may be effected through other means as for instance by a cam, however, I at present prefer the means disclosed because of its simplicity and ruggedness.

I claim:

1. In electric arc welding apparatus, a welding electrode, means for feeding said electrode to the arc, and means for passing welding current to said electrode, said electrode, said electrode feeding means and said current passing means being rotatable as a unit about the axis of said electrode.

2. In electric arc welding apparatus a welding electrode having a metallic core and a non-conducting covering, said covering being broken at spaced intervals to expose portions of said core, contact means for passing welding current to said exposed portions, said electrode and said means being rotatable about the axis of said electrode as a unit.

3. In electric arc welding apparatus, a welding electrode, means supporting said electrode for rotation about its axis and contact means for passing welding current to said electrode, said contact means being connected to said supporting means to be rotatable with said electrode.

4. In electric arc welding apparatus, a support, a casing supported by said support and mounted to be rotatable relative thereto, electrode feeding means mounted in said casing, a drive motor fixedly mounted relative to said support, and means connecting said motor to said electrode feeding means.

5. In electric arc welding apparatus, a support, a casing supported therefrom for rotation relative thereto, a welding electrode feeding wheel mounted in said casing, a gear train also mounted in said casing for rotating said wheel, a motor fixedly mounted relative to said support, means connecting said motor and said gear train adapted to drive said gear train and said wheel in all positions of said casing relative to said support, and means cooperating with said casing and said gear train to prevent change in feed of said electrode due to rotation of said casing about said support.

6. In electric arc welding apparatus, a support, a casing supported for rotation relative thereto, a welding electrode feeding wheel mounted in said casing, a gear train also mounted in said casing for rotating said wheel, a motor fixedly mounted relative to said support, means connecting said motor and said gear train adapted to drive said gear train and said wheel in all positions of said casing relative to said support, means for rotating said casing relative to said support, and means for preventing rotation of said casing by said motor.

7. In electric arc welding apparatus, a support, electrode feeding means supported therefrom for rotation relative thereto, motor means fixedly mounted relative to said support, means connecting said motor means and said electrode feeding means adapted to drive said electrode feeding means in all positions of said electrode feeding means relative to said support, means for rotating said electrode feeding means relative to said support, means preventing said motor means from rotating said electrode feeding means relative to said support, and means preventing change in feed of said electrode feeding means due to rotation of said feeding means relative to said support.

8. In electric arc welding apparatus, a support having a hole therethrough, a hollow member in said hole, a casing supported from said hollow member for rotation relative thereto, a second casing supported in said first casing for longitudinal movement relative thereto, electrode feeding means supported in said second casing, a motor, means including means passing through said hollow member for connecting said motor to said feeding means, and means for moving said second casing relative to said first casing upon rotation of said first casing to compensate for the effect of the rotation of said first casing on said electrode feeding means.

9. In combination with a welding electrode, a support having a hole therethrough, a hollow member in said hole, a casing supported on said hollow member for rotation relative to said support, electrode feeding means supported in said casing, a motor fixed relative to said support, and means including a hollow shaft in said hollow member allowing the welding electrode to pass therethrough to said electrode feeding means and connected to said motor adapted to drive said electrode feeding means in all positions of said casing relative to said support.

10. In electric arc welding apparatus, a support having a hole therethrough, a hollow member extending through said hole, a casing supported from said hollow member for rotation relative to said support, a shaft journalled in said casing, a welding electrode feeding wheel mounted on said shaft, a gear also mounted on said shaft, a second shaft journalled in said casing, a second gear mounted on said second shaft adapted to mesh with said first gear, a third gear mounted on said second shaft, a hollow shaft mounted for rotation in said hollow member, a fourth gear mounted on one end of said hollow shaft adapted to mesh with said third gear, a bevel gear mounted on the other end of said hollow shaft, a motor fixedly mounted relative to said support, and a second bevel gear adapted to be driven by said motor and adapted to mesh with said first bevel gear.

11. In electric arc welding apparatus adapted to feed a welding electrode to the work, a support having a hole therethrough, a hollow member extending through said hole, a casing supported from said hollow member for rotation relative to said support, a shaft journalled in said casing, a welding electrode feeding wheel mounted on said shaft, a second shaft journalled in said casing, a second wheel mounted on said second shaft adapted to bear on the electrode to maintain it in non-slip relation with said feeding wheel, a gear mounted on said first shaft, a third shaft journalled in said casing, a second gear mounted on said third shaft adapted to mesh with said first gear, a third gear mounted on said third shaft, a hollow shaft mounted for rotation in said hollow member, a fourth gear mounted on one end of said hollow shaft adapted to mesh with said third gear, a bevel gear mounted on the other end of said hollow shaft, a motor fixedly mounted relative to said support, and a second bevel gear adapted to be driven by said motor and adapted to mesh with said first bevel gear.

12. In electric arc welding apparatus, a support having a hole therein, a motor fixedly mounted relative thereto, a hollow member extending through said hole, a casing supported for rotation relative to said support, a second casing within said first casing, means in said first casing supporting said second casing for longitudinal movement relative to said first casing, a welding electrode feeding wheel supported in said second casing, a hollow shaft supported for rotation in said hollow member, means connecting said hollow shaft to said motor, a gear train connecting said hollow shaft to said feeding wheel, said gear train including a gear mounted for longitudinal movement on said hollow shaft, and means for moving said second casing and said gear longitudinally of said first casing upon rotation of said first casing.

13. In electric arc welding apparatus, a support having a hole therein, a motor fixedly mounted relative thereto, a hollow member extending through said hole, a casing supported on said hollow member for rotation relative to said support, a welding electrode feeding wheel supported in said casing, a hollow shaft supported for rotation in said hollow member, means connecting said hollow shaft to said motor, and a gear train connecting said hollow shaft to said feeding wheel, said hollow member and said casing including means effective upon rotation of said casing to move said casing longitudinally relative to said support by a distance equal to the rotation of said feeding wheel due to the rotation of said casing.

14. In electric arc welding apparatus, a support having a hole therein, a motor fixedly mounted relative thereto, a hollow member extending through said hole, the bottom end of said hollow member being screw threaded, a casing having a top with a screw threaded hole therein adapted to be screwed onto the threaded end of said hollow member, a welding electrode feeding wheel supported in said casing, a hollow shaft supported for rotation in said hollow member, means connecting said hollow shaft to said motor, and a gear train connecting said hollow shaft to said feeding wheel, the pitch of the threads of said hollow member and said threaded hole being such that upon rotation of said casing said casing moves relative to said support through a distance equal to the rotation of said feeding wheel due to the rotation of said casing.

15. In electric arc welding apparatus, a support having a hole therein, a motor fixedly mounted relative thereto, a hollow member extending through said hole, the bottom end of said hollow member being screw threaded, a casing supported from said hollow member for rotation relative to said support, a second casing in said first casing having a top with a screw threaded hole therein adapted to be screwed onto the threaded end of said hollow member, means in said first casing preventing relative rotation of said casings, means for rotation of said first casing, a welding electrode feeding wheel supported in said second casing, a hollow shaft supported for rotation in said hollow member, means connecting said hollow shaft to said motor, and a gear train connecting said hollow shaft to said feeding wheel, the pitch of the threads of said hollow member and said threaded hole being such that upon rotation of said casings said second casing moves relative to said support through a distance equal to the rotation of said feeding wheel due to the rotation of said second casing.

16. In electric arc welding apparatus, a support having a hole therein, a motor fixedly mounted relative thereto, a hollow member extending through said hole, the bottom end of said hollow member being screw threaded, a casing having a top with a screw threaded hole therein adapted to be screwed onto the threaded end of said hollow member, a welding electrode feeding wheel supported in said casing, a hollow shaft supported for rotation in said hollow member, means connecting said hollow shaft to said member, a gear train connecting said hollow shaft to said feeding wheel, said gear train including a gear mounted on said hollow shaft for longitudinal movement relative thereto, and means connected to said casing for moving said gear on said hollow shaft with said casing, the pitch of the threads of said hollow member and said hole being such that upon rotation of said casing said casing moves relative to said support through a distance equal to the rotation of said feeding wheel due to the rotation of said casing.

ROBERT K. HOPKINS.